(12) United States Patent
Zhang et al.

(10) Patent No.: US 10,326,571 B2
(45) Date of Patent: Jun. 18, 2019

(54) RESOURCE ALLOCATION INSTRUCTION METHOD AND DEVICE

(71) Applicant: ZTE CORPORATION, Shenzhen, Guangdong Province (CN)

(72) Inventors: Wen Zhang, Shenzhen (CN); Shuqiang Xia, Shenzhen (CN); Bo Dai, Shenzhen (CN); Jing Shi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/547,070

(22) PCT Filed: Jan. 12, 2016

(86) PCT No.: PCT/CN2016/070716
§ 371 (c)(1),
(2) Date: Jul. 28, 2017

(87) PCT Pub. No.: WO2016/119592
PCT Pub. Date: Aug. 4, 2016

(65) Prior Publication Data
US 2018/0026763 A1    Jan. 25, 2018

(30) Foreign Application Priority Data

Jan. 30, 2015    (CN) .......................... 2015 1 0054776

(51) Int. Cl.
*H04W 4/00*    (2018.01)
*H04L 12/927*    (2013.01)
(Continued)

(52) U.S. Cl.
CPC .......... *H04L 5/0046* (2013.01); *H04L 1/1614* (2013.01); *H04W 4/70* (2018.02);
(Continued)

(58) Field of Classification Search
CPC ........ H04W 72/04; H04W 4/70; H04L 5/0042
(Continued)

(56) References Cited

U.S. PATENT DOCUMENTS

| | | | | |
|---|---|---|---|---|
| 2008/0139214 A1* | 6/2008 | Sun | .................... | H04W 72/042 455/450 |
| 2011/0110322 A1* | 5/2011 | Koyanagi | ............. | H04L 5/0041 370/329 |
| 2012/0113912 A1* | 5/2012 | Ogawa | .................. | H04L 5/0007 370/329 |

FOREIGN PATENT DOCUMENTS

| | | |
|---|---|---|
| CN | 102083226 A | 6/2011 |
| CN | 102223719 A | 10/2011 |
| WO | WO2010124721 A1 | 11/2010 |

OTHER PUBLICATIONS

ETRI, "Signaling for DL Resource Assignment Indication", 3GPP TSG RAN WG1 Meeting #45 R1-061395, May 12, 2006 (May 12, 2006), the whole document.

* cited by examiner

*Primary Examiner* — Asad M Nawaz
*Assistant Examiner* — Jason A Harley
(74) *Attorney, Agent, or Firm* — Ling Wu; Stephen Yang; Ling and Yang Intellectual Property

(57) ABSTRACT

The document discloses a method and device for indicating a resource allocation. The method includes: determining a number of required indication bits according to the following parameters: a number N of allocable resources in a system, and a maximum number M of allocated resources supported by UE, herein $2 \leq M < N$; and indicating the resource allocation by adopting a binary number, herein a bit number of the binary number is equal to the determined number of the indication bits.

18 Claims, 1 Drawing Sheet

(51) Int. Cl.
*H04W 72/04* (2009.01)
*H04W 72/00* (2009.01)
*H04L 5/00* (2006.01)
*H04W 4/70* (2018.01)
*H04L 1/16* (2006.01)
*H04W 88/02* (2009.01)

(52) U.S. Cl.
CPC ......... *H04W 72/042* (2013.01); *H04L 5/0042* (2013.01); *H04W 88/02* (2013.01)

(58) Field of Classification Search
USPC ........................................ 370/236.1; 718/104
See application file for complete search history.

RESOURCE ALLOCATION INSTRUCTION METHOD AND DEVICE

TECHNICAL FIELD

The present disclosure relates to, but not limited to, the field of radio communications.

BACKGROUND

At present, Machine Type Communication (MTC) User Equipment (UE), also called Machine to Machine (M2M) user communication equipment, is a main application form of the current Internet of things.

In recent years, a Long-Term Evolution (LTE)/Long-Term Evolution Advance (LTE-Advance or LTE-A) system has a high spectral efficiency, therefore more and more mobile operating companies select LTE/LTE-A as an evolution direction of a broadband wireless communication system. Various types of LTE/LTE-A-based MTC data services will also become more attractive.

MTC equipment is usually low-cost equipment, and has characteristics of relatively narrow Radio Frequency (RF) bandwidth supported by itself, single receiving antenna and the like. RF sending and receiving bandwidth of the MTC equipment are usually 1.4 MHz, and the MTC equipment can only send or receive data of no more than 6 Physical Resource Blocks (PRBs). In a resource indication method of a related technology, a bitmap manner can only be adopted under a condition that a bandwidth is smaller than 10 Resource Blocks (RBs). A resource allocation "type 1" is a bitmap manner based on a Resource Block Group (RBG), and cannot indicate one or more RBs in any 6 continuous RBs. A resource allocation "type 2" is a continuous resource allocation manner, and cannot indicate multiple discontinuous RBs in any 6 continuous RBs. It can be seen that the resource indication method of the related technology cannot implement flexible scheduling of MTC UE. Moreover, due to a limit that RBs allocated to the MTC UE do not exceed 6 continuous RBs, a bit number indicating a resource allocation of the MTC UE theoretically may be smaller than a bit number required by the resource indication method directly adopting the related technology.

SUMMARY

The below is the summary of a subject described in detail in the present document, and the summary is not intended to limit the scope of protection of the claims.

The present document provides a solution for indicating a resource allocation, which can implement flexible scheduling of UE and is relatively low in overhead.

A method for indicating a resource allocation includes:
determining a number of required indication bits according to the following parameters:
a number N of allocable resources in a system, and
a maximum number M of allocated resources supported by UE, herein $2 \leq M < N$; and
indicating the resource allocation by adopting a binary number, herein a bit number of the binary number is equal to the determined number of the indication bits.

In an exemplary embodiment, indicating the resource allocation by adopting a binary number includes: indicating one or more in any M continuous resources by adopting the binary number, herein the binary number is obtained by converting a decimal number r or obtained by converting a decimal number R which is obtained according to r, and the r and the R are as follows:

when $$s_0 \leq N - M, r = 2^{M-1} \times s_0 + \left(\sum_{i=1}^{m-1} 2^{v1_i}\right),$$

and $v1_i$ and $s_i-s_0$ being in a predetermined one-to-one corresponding relationship and $v1_i \in \{0, 1, 2 \ldots, M-2\}$;

when $$s_0 > N - M, r = 2^{M-1} \times (N - M + 1) + \left(\sum_{i=0}^{m-1} 2^{v2_i}\right) - 1,$$

and $v2_i$ and $s_i-N$ being in a predetermined one-to-one corresponding relationship and $v2_i \in \{0, 1, 2 \ldots, M-2\}$, herein $s_i$ is an index of a resource allocated to the UE, and $i=0, 1 \ldots m-1$, and m is a number of resources allocated to the UE, and $s_i < s_{i+1}$ is met;

$R=(r+C) \bmod ((N-M+2)*2^{M-1}-1)$, herein C is a constant, and "mod" represents a modulo operation;

or, when $$s_0 < N - M, r = 2^{M-1} \times s_0 + \left(\sum_{i=1}^{m-1} 2^{v3_i}\right),$$

and $v3_i$ and $s_i-s_0$ being in a predetermined one-to-one corresponding relationship and $v3_i \in \{0, 1, 2 \ldots, M-2\}$;

when $$s_0 \geq N - M, r = 2^{M-1} * (N - M) + \left(\sum_{i=0}^{m-1} 2^{v4_i}\right) - 1,$$

and $v4_i$ and $s_i-N$ being in a predetermined one-to-one corresponding relationship and $v4_i \in \{0, 1, 2 \ldots, M-2\}$; and
$R=(r+C) \bmod ((N-M+2)*2^{M-1}-1)$, herein C is a constant.

In an exemplary embodiment, $v1_i=s_i-s_0-1$, and $v2_i=s_i-N+M-1$ or $v2_i=N-1-s_i$; and
$v3_i=s_i-s_0-1$, and $v4_i=s_i-N+M$ or $v4_i=N-1-s_i$.

In an exemplary embodiment, indicating the resource allocation by adopting a binary number includes: indicating one or more in any M continuous resources by adopting the binary number, herein the binary number is obtained by converting a decimal number r or obtained by converting a decimal number R which is obtained according to r, and the r and the R are as follows:

when $$s_{m-1} \leq M - 1, r = \left(\sum_{i=0}^{m-1} 2^{s_i}\right) - 1;$$

when $$s_{m-1} > M-1, r = 2^{M-1}*(s_{m-1}-M+2)+\left(\sum_{i=0}^{m-2} 2^{v5_i}\right)-1,$$

and $v5_i$ and $s_{m-1}-s_i$ being in a predetermined one-to-one corresponding relationship and $v5_i \in \{0, 1, 2, \ldots, M-2\}$;

herein $s_i$ is an index of a resource allocated to the UE, and i=0, 1 ... m−1, and m is a number of resources allocated to the UE, and $s_i < s_{i+1}$ is met;

$R=(r+C) \bmod ((N-M+2)*2^{M-1}-1)$, herein C is a constant;

or, when $$s_{m-1} < M-1, r = \left(\sum_{i=0}^{m-1} 2^{s_i}\right)-1;$$

when $$s_{m-1} \geq M-1, r = 2^{M-1}*(s_{m-1}-M+2)+\left(\sum_{i=0}^{m-2} 2^{v6_i}\right)-1,$$

and $v6_i$ and $s_i-s_{m-1}$ being in a predetermined one-to-one corresponding relationship and $v6_i \in \{0, 1, 2, \ldots, M-2\}$;

herein $s_i$ is an index of a resource allocated to the UE, and i=0, 1 ... m−1, and m is a number of resources allocated to the UE, and $s_i < s_{i+1}$ is met; and $R=(r+C) \bmod ((N-M+2)*2^{M-1}-1)$, herein C is a constant.

In an exemplary embodiment, $v5_i = s_{m-1}-s_i-1$ or $v5_i = M-1+s_i-s_{m-1}$; and $v6_i = s_{m-1}-s_i-1$ or $v6_i = M-1+s_i-s_{m-1}$.

In an exemplary embodiment, indicating the resource allocation by adopting a binary number includes: indicating one or more in any M continuous resources by adopting the binary number, herein the binary number is obtained by converting a decimal number r or obtained by converting a decimal number R which is obtained according to r, and the r and the R are as follows:

when $$x \leq N-M, r = 2^{M-1}*x+\left(\sum_{i=1}^{M-1} b_i*2^{i-1}\right),$$

herein x is an index of a starting resource allocated to the UE, and $b_1, b_2, \ldots b_{M-1}$ are binary bits obtained by performing a bitmap mapping on resources of which indexes are x+1, x+2, ..., x+M−1;

when $$x > N-M, r = 2^{M-1}*(N-M+1)+\left(\sum_{i=1}^{M-1} b_i*2^{i-1}\right)-1;$$

herein $b_1, b_2, \ldots, b_{M-1}$ are corresponding binary bits obtained by performing the bitmap mapping on resources of which indexes are N−M+1, ..., N−1;

$R=(r+C) \bmod ((N-M+2)*2^{M-1}-1)$, herein C is a constant;

or, when $$x < N-M, r = 2^{M-1}*x+\left(\sum_{i=1}^{M-1} b_i*2^{i-1}\right);$$

herein x is an index of a starting resource allocated to the UE, and $b_1, b_2, \ldots, b_{M-1}$ are binary bits obtained by performing a bitmap mapping on resources of which indexes are x+1, x+2, ..., x+M−1;

when $$x \geq N-M, r = 2^{M-1}*(N-M)+\left(\sum_{i=1}^{M} b_i*2^{i-1}\right)-1,$$

herein $b_1, b_2, \ldots, b_M$ are binary bits obtained by performing the bitmap mapping on resources of which indexes are N−M, N−M+1, ..., N−1; and $R=(r+C) \bmod ((N-M+2)*2^{M-1}-1)$, herein C is a constant.

In an exemplary embodiment, indicating the resource allocation by adopting a binary number includes: indicating one or more in any M continuous resources by adopting the binary number, herein the binary number is obtained by converting a decimal number r or obtained by converting a decimal number R which is obtained according to r, and the r and the R are as follows:

when $$x \leq M-1, r = \left(\sum_{i=0}^{M-1} b_i*2^i\right)-1;$$

herein x is a maximum index of resources allocated to the UE, and $b_0, b_1, b_2, \ldots, b_{M-1}$ are binary bits obtained by performing a bitmap mapping on resources of which indexes are 0, 1, ..., M−1;

when $$x > M-1, r = 2^{M-1}*(x-M+2)+\left(\sum_{i=0}^{M-2} b_i*2^i\right)-1;$$

herein $b_0, b_1, b_2, \ldots, b_{M-2}$ are binary bits obtained by performing the bitmap mapping on resources of which indexes are x−M+1, x−M+2, ..., x−1;

$R=(r+C) \bmod ((N-M+2)*2^{M-1}-1)$, herein C is a constant;

or, when $$x < M-1, r = \left(\sum_{i=0}^{M-2} b_i*2^i\right)-1;$$

herein x is a maximum value of indexes of resources allocated to the UE, and $b_0, b_1, b_2, \ldots, b_{M-2}$ are binary bits obtained by performing a bitmap mapping on resources of which indexes are 0, 1, ..., M−2;

when $$x \geq M-1, r = 2^{M-1} \times (x-M+2) + \left(\sum_{i=0}^{M-2} b_i * 2^i\right) - 1;$$

herein $b_0$, $b_1$, $b_2$, ..., $b_{M-2}$ are binary bits obtained by performing the bitmap mapping on resources of which indexes are $x-M+1$, $x-M+2$, ..., $x-1$; and $R=(r+C)\mod((N-M+2)*2^{M-1}-1)$, herein C is a constant.

In an exemplary embodiment, indicating the resource allocation by adopting a binary number includes: indicating m continuous resources allocated to the UE by adopting the binary number, herein $1 \leq m \leq M$, and the binary number is obtained by converting a decimal number r or obtained by converting a decimal number R which is obtained according to r, and the r and the R are as follows:

when $x \leq N-M$, $r = x \times M + L - 1$;

herein x is an index of a starting resource allocated to the UE, and L is a number of resources allocated to the UE;

when $x > N-M$, $r = (N-M+1) \times M + \sum_{i=0}^{N-1-x}(i) + L - 1$;

$$R = (r+C)\mod\left(M \times (N-M+1) + \frac{M(M-1)}{2}\right),$$

herein C is a constant;

or, when $x < N-M$, $r = x \times M + L - 1$;

herein x is an index of a starting resource allocated to the UE, and L is a number of resources allocated to the UE;

when $x \geq N-M$, $r = (N-M) \times M + \sum_{i=0}^{N-1-x}(i) + L - 1$; and $$R = (r+C)\mod\left(M \times (N-M+1) + \frac{M(M-1)}{2}\right),$$

herein C is a constant.

In an exemplary embodiment, indicating the resource allocation by adopting a binary number includes: indicating m continuous resources allocated to the UE by adopting the binary number, herein $1 \leq m \leq M$, and the binary number is obtained by converting a decimal number r or obtained by converting a decimal number R which is obtained according to r, and the r and the R are as follows:

when $x \leq M-1$, $r = \sum_{i=0}^{x}(i) + L - 1$;

herein x is a maximum index of resources allocated to the UE, and L is a number of the resources allocated to the UE;

when $$x > M-1, r = \frac{M \times (M+1)}{2} + (x-M) \times M + L - 1;$$

$$R = (r+C)\mod\left(M \times (N-M+1) + \frac{M(M-1)}{2}\right),$$

herein C is a constant;

or, when $x < M-1$, $r = \sum_{i=0}^{x}(i) + L - 1$;

herein x is a maximum index of resources allocated to the UE, and L is a number of the resources allocated to the UE;

when $$x \geq M-1, r = \frac{M \times (M-1)}{2} + (x-M+1) \times M + L - 1;\text{ and}$$

$$R = (r+C)\mod\left(M \times (N-M+1) + \frac{M(M-1)}{2}\right),$$

herein C is a constant, and

L is a number of RBs allocated to the UE.

In an exemplary embodiment, indicating the resource allocation by adopting a binary number includes: indicating m continuous resources allocated to the UE by adopting the binary number, herein $1 \leq m \leq M$, and the binary number is obtained by converting a decimal number r, and the r is as follows:

$r = N(L-1) + x$, $1 \leq L \leq M$, herein x is an index of a starting resource allocated to the UE, and L is a number of resources allocated to the UE, and N is a positive integer and $N \in \{15, 25, 50, 75, 100\}$, and M is a positive integer no more than 7.

In an exemplary embodiment, the number of the required indication bits is $Q = \lceil \log_2((N-M+2)*2^{M-1}-1) \rceil$.

In an exemplary embodiment, the number of the required indication bits is $$Q = \left\lceil \log_2\left(M \times (N-M+1) + \frac{M(M-1)}{2}\right) \right\rceil.$$

A device for indicating a resource allocation includes:

a determining module, configured to determine a number of required indication bits according to the following parameters:

a number N of allocable resources in a system, and a maximum number M of allocated resources supported by User Equipment, UE, herein $2 \leq M < N$; and an indicating module, configured to indicate the resource allocation by adopting a binary number, herein a bit number of the binary number is equal to the determined number of the indication bits.

In an exemplary embodiment, the indicating module is configured to indicate one or more in any M continuous resources by adopting the binary number, herein the binary number is obtained by converting a decimal number r or obtained by converting a decimal number R which is obtained according to r, and the r and the R are as follows:

when $$s_0 \leq N-M, r = 2^{M-1} \times s_0 + \left(\sum_{i=1}^{m-1} 2^{v1_i}\right),$$

and $v1_i$ and $s_i - s_0$ being in a predetermined one-to-one corresponding relationship and $v1_i \in \{0, 1, 2, ..., M-2\}$;

when $$s_0 > N-M, r = 2^{M-1} \times (N-M+1) + \left(\sum_{i=0}^{m-1} s^{v2_i}\right) - 1,$$

and $v2_i$ and $s_i - N$ being in a predetermined one-to-one corresponding relationship and $v2_i \Sigma \{0, 1, 2, ..., M-2\}$;

herein $s_i$ is an index of a resource allocated to the UE, and $i = 0, 1 ... m-1$, and m is a number of resources allocated to the UE, and $s_i < s_{i+1}$ is met;

$R=(r+C)\mod((N-M+2)*2^{M-1}-1)$, herein C is a constant, and "mod" represents a modulo operation;
or,
when $$s_0 < N-M, r = 2^{M-1} \times s_0 + \left(\sum_{i=1}^{m-1} 2^{v3_i}\right),$$

and $v3_i$ and $s_i-s_0$ being in a predetermined one-to-one corresponding relationship and $v3_i \in \{0, 1, 2 \ldots, M-2\}$;
when $$s_0 \geq N-M, r = 2^{M-1}*(N-M) + \left(\sum_{i=0}^{m-1} 2^{v4_i}\right) - 1,$$

and $v4_i$ and $s_i-N$ being in a predetermined one-to-one corresponding relationship and $v4_i \in \{0, 1, 2 \ldots, M-2\}$; and
$R=(r+C)\mod((N-M+2)*2^{M-1}-1)$, herein C is a constant.

In an exemplary embodiment, $v1_i=s_i-s_0-1$, and $v2_i=s_i-N+M-1$ or $v2_i=N-1-s_i$; and
$v3_i=s_i-s_0-1$, and $v4_i=s_i-N+M$ or $v4_i=N-1-s_i$.

In an exemplary embodiment, the indicating module is configured to indicate one or more in any M continuous resources by adopting the binary number, herein the binary number is obtained by converting the decimal number r or obtained by converting the decimal number R which is obtained according to r, and the r and the R are as follows:
when $$s_{m-1} \leq M-1, r = \left(\sum_{i=0}^{m-1} 2^{s_i}\right) - 1;$$

when $$s_{m-1} > M-1, r = 2^{M-1}*(s_{m-1}-M+2) + \left(\sum_{i=0}^{m-2} 2^{v5_i}\right) - 1,$$

and $v5_i$ and $s_{m-1}-s_i$ being in a predetermined one-to-one corresponding relationship and $v5_i \in \{0, 1, 2, \ldots, M-2\}$;
herein $s_i$ is an index of a resource allocated to the UE, and $i=0, 1 \ldots m-1$, and m is the number of the resources allocated to the UE, and $s_i<s_{i+1}$ is met;
$R=(r+C)\mod((N-M+2)*2^{M-1}-1)$, herein C is a constant;
or,
when $$s_{m-1} < M-1, r = \left(\sum_{i=0}^{m-1} 2^{s_i}\right) - 1;$$

when $$s_{m-1} \geq M-1, r = 2^{M-1}*(s_{m-1}-M+2) + \left(\sum_{i=0}^{m-2} 2^{v6_i}\right) - 1,$$

and $v6_i$ and $s_i-s_{m-1}$ being in a predetermined one-to-one corresponding relationship and $v6_i \in \{0, 1, 2, \ldots, M-2\}$;
herein $s_i$ is an index of a resource allocated to the UE, and $i=0, 1 \ldots m-1$, and m is the number of the resources allocated to the UE, and $s_i<s_{i+1}$ is met; and
$R=(r+C)\mod((N-M+2)*2^{M-1}-1)$, herein C is a constant.

In an exemplary embodiment, $v5_i=s_{m-1}-s_i-1$ or $v5_i=M-1+s_i-s_{m-1}$; and
$v6_i=s_{m-1}-s_i-1$ or $v6_i=M-1+s_i-s_{m-1}$.

In an exemplary embodiment, the indicating module is configured to indicate one or more in any M continuous resources by adopting the binary number, herein the binary number is obtained by converting a decimal number r or obtained by converting a decimal number R which is obtained according to r, and the r and the R are as follows:
when $$x \leq N-M, r = 2^{M-1}*x + \left(\sum_{i=1}^{M-1} b_i*2^{i-1}\right);$$

herein x is an index of a starting resource allocated to the UE, and $b_1, b_2, \ldots, b_{M-1}$ are binary bits obtained by performing a bitmap mapping on resources of which indexes are $x+1, x+2, \ldots, x+M-1$;
when $$x > N-M, r = 2^{M-1}*(N-M+1) + \left(\sum_{i=1}^{M-1} b_i*2^{i-1}\right) - 1;$$

herein $b_1, b_2, \ldots, b_{M-1}$ are corresponding binary bits obtained by performing the bitmap mapping on resources of which indexes are $N-M+1, \ldots, N-1$;
$R=(r+C)\mod((N-M+2)*2^{M-1}-1)$, herein C is a constant;
or,
when $$x < N-M, r = 2^{M-1}*x + \left(\sum_{i=1}^{M-1} b_i*2^{i-1}\right);$$

herein x is an index of a starting resource allocated to the UE, and $b_1, b_2, \ldots, b_{M-1}$ are the binary bits obtained by performing the bitmap mapping on resources of which indexes are $x+1, x+2, \ldots, x+M-1$;
when $$x \geq N-M, r = 2^{M-1}*(N-M) + \left(\sum_{i=1}^{M} b_i*2^{i-1}\right) - 1;$$

herein $b_1, b_2, \ldots, b_M$ are binary bits obtained by performing the bitmap mapping on resources of which indexes are $N-M, N-M+1, \ldots, N-1$; and
$R=(r+C)\mod((N-M+2)*2^{M-1}-1)$, herein C is a constant.

In an exemplary embodiment, the indicating module is configured to indicate one or more in any M continuous resources by adopting the binary number, herein the binary number is obtained by converting a decimal number r or obtained by converting a decimal number R which is obtained according to r, and the r and the R are as follows:

when $$x \leq M - 1, r = \left(\sum_{i=0}^{M-1} b_i * 2^i\right) - 1;$$

herein x is a maximum index of resources allocated to the UE, and $b_0, b_1, b_2, \ldots, b_{M-1}$ are binary bits obtained by performing a bitmap mapping on resources of which indexes are 0, 1, ..., M-1;
when $$x > M - 1, r = 2^{M-1} * (x - M + 2) + \left(\sum_{i=0}^{M-2} b_i * 2^i\right) - 1;$$

herein $b_0, b_1, b_2, \ldots, b_{M-2}$ are binary bits obtained by performing the bitmap mapping on resources of which indexes are x−M+1, x−M+2, ..., x−1;
$R=(r+C)\bmod((N-M+2)*2^{M-1}-1)$, herein C is a constant;
or,
when $$x < M - 1, r = \left(\sum_{i=0}^{M-2} b_i * 2^i\right) - 1;$$

herein x is a maximum value of indexes of resources allocated to the UE, and $b_0, b_1, b_2, \ldots, b_{M-2}$ are binary bits obtained by performing a bitmap mapping on resources of which indexes are 0, 1, ..., M−2;
when $$x \geq M - 1, r = 2^{M-1} \times (x - M + 2) + \left(\sum_{i=0}^{M-2} b_i * 2^i\right) - 1;$$

herein $b_0, b_1, b_2, \ldots, b_{M-2}$ are the binary bits obtained by performing the bitmap mapping on the resources of which indexes are x−M+1, x−M+2, ..., x−1; and
$R=(r+C)\bmod((N-M+2)*2^{M-1}-1)$, herein C is a constant.

In an exemplary embodiment, the indicating module is configured to indicate m continuous resources allocated to the UE by adopting the binary number, herein 1≤m≤M, and the binary number is obtained by converting a decimal number r or obtained by converting a decimal number R which is obtained according to r, and the r and the R are as follows:
when x≤N−M, r=x×M+L−1;
herein x is an index of a starting resource allocated to the UE, and L is a number of the resources allocated to the UE;
when $$x > N - M, r = (N - M + 1) \times M + \sum_{i=0}^{N-1-x} (i) + L - 1;$$

$$R = (r + C)\bmod\left(M \times (N - M + 1) + \frac{M(M-1)}{2}\right),$$

herein C is a constant;
or,
when x<N−M, r=x×M+L−1;
herein x is an index of a starting resource allocated to the UE, and L is a number of the resources allocated to the UE;
when $$x \geq N - M, r = (N - M) \times M + \sum_{i=0}^{N-1-x} (i) + L - 1; \text{ and}$$

$$R = (r + C)\bmod\left(M \times (N - M + 1) + \frac{M(M-1)}{2}\right),$$

herein C is a constant.

In an exemplary embodiment, the indicating module is configured to indicate m continuous resources allocated to the UE by adopting the binary number, herein 1≤m≤M, and the binary number is obtained by converting a decimal number r or obtained by converting a decimal number R which is obtained according to r, and the r and the R are as follows:
when x≤−1, $r=\sum_{i=0}^{x}(i)+L-1$;
herein x is the maximum index of resources allocated to the UE, and L is a number of the resources allocated to the UE;
when $$x > M - 1, r = \frac{M \times (M + 1)}{2} + (x - M) \times M + L - 1;$$

$$R = (r + C)\bmod\left(M \times (N - M + 1) + \frac{M(M-1)}{2}\right),$$

herein C is a constant;
or,
when x<M−1, $r=\sum_{i=0}^{x}(i)+L-1$;
herein x is a maximum index of resources allocated to the UE, and L is a number of the resources allocated to the UE;
when $$x \geq M - 1, r = \frac{M \times (M - 1)}{2} + (x - M + 1) \times M + L - 1; \text{ and}$$

$$R = (r + C)\bmod\left(M \times (N - M + 1) + \frac{M(M-1)}{2}\right),$$

herein C is a constant, and
L is a number of RBs allocated to the UE.

In an exemplary embodiment, the indicating module is configured to indicate m continuous resources allocated to the UE by adopting the binary number, herein 1≤m≤M, and the binary number is obtained by converting a decimal number r, and the r is as follows:
r=N(L−1)+x, 1≤L≤M, herein x is an index of a starting resource allocated to the UE, and L is a number of the resources allocated to the UE, and N is a positive integer and N∈{15, 25, 50, 75, 100}, and M is a positive integer no more than 7.

In an exemplary embodiment, the number, determined by the determining module, of the required indication bits is $Q=\log_2((N-M+2)*2^{M-1}-1)$.

In an exemplary embodiment, the number, determined by the determining module, of the required indication bits is $$Q = \left\lceil \log_2\left(M \times (N - M + 1) + \frac{M(M-1)}{2}\right) \right\rceil.$$

A computer-readable storage medium stores a computer-executable instruction, and the computer-executable instruction is used to execute any abovementioned method.

Embodiments of the present disclosure may be applied to indicating an uplink and downlink resource allocation. The disclosed method may implement flexible scheduling of the UE, and is relatively low in overhead. The disclosed method is not limited to allocation of RBs on a physical layer, and may be adopted for allocation of any resources, including frequency-domain resources, or time-domain resources, or code resources or mixtures of the above.

After the drawings and the detailed descriptions are read and understood, the other aspects can be understood.

DETAILED DESCRIPTION

Implements of the present disclosure will be described below with reference to the drawings and embodiments.

It is important to note that the embodiments of the present disclosure and various characteristics in the embodiments may be combined with each other without conflicts. In addition, although a logic sequence is shown in the flowchart, the shown or described steps may be executed in a sequence different from that described here under some conditions.

Figure 1:
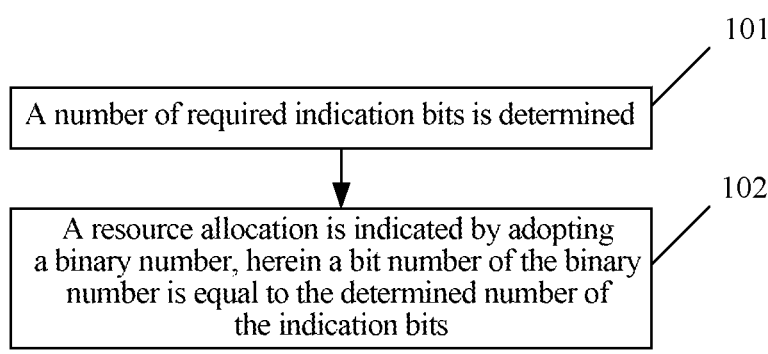
FIG. 1 is a flowchart of a method for indicating a resource allocation according to an embodiment of the present disclosure.

A method for indicating a resource allocation, as shown in FIG. 1, includes the following steps.

In step 101, a number of required indication bits is determined according to the following parameters:

a number N of allocable resources in a system, and a maximum number M of allocated resources supported by UE, herein 2≤M<N.

In step 102, the resource allocation is indicated by adopting a binary number, and a bit number of the binary number is equal to the determined number of the indication bits.

In an exemplary embodiment, that the resource allocation is indicated by adopting the binary number includes: indicating one or more in any M continuous resources by adopting the binary number, herein the binary number is obtained by converting a decimal number r or obtained by converting a decimal number R which is obtained according to r, and the r and the R are one of the followings.

(1) When $$s_0 \leq N - M, r = 2^{M-1} \times s_0 + \left(\sum_{i=1}^{m-1} 2^{v_i}\right), v_i = s_i - s_0 - 1.$$

When $$s_0 > N - M, r = 2^{M-1} \times (N - M + 1) + \left(\sum_{i=0}^{m-1} 2^{v_i}\right) - 1,$$

$$v_i = s_i - N + M - 1 \text{ or } v_i = N - 1 - s_i.$$

Herein, $s_i$ is an index of a resource allocated to the UE, and i=0, 1 ... m−1, and m is a number of resources allocated to the UE, and $s_i < s_{i+1}$ is met.

$R = (r+C) \bmod((N-M+2)*2^{M-1}-1)$, herein C is a constant, and "mod" represents a modulo operation.

Or, when $$s_0 < N - M, r = 2^{M-1} \times s_0 + \left(\sum_{i=1}^{m-1} 2^{v_i}\right), v_i = s_i - s_0 - 1;$$

when $$s_0 \geq N - M, r = 2^{M-1} * (N - M) + \left(\sum_{i=0}^{m-1} 2^{v_i}\right) - 1,$$

$v_i = s_i - N + M$, or $v_i = N - 1 - s_i$; and $R = (r + C) \bmod((N - M + 2) * 2^{M-1} - 1),$ herein C is a constant.

In an embodiment of the present disclosure, two calculation methods are optional for calculating $v_i$, and when an Evolved Node B (eNB) allocates RBs to the UE, any one may be adopted for calculating $v_i$.

(2) When $$s_{m-1} \leq M - 1, r = \left(\sum_{i=0}^{m-1} 2^{s_i}\right) - 1.$$

When $$s_{m-1} > M - 1, r = 2^{M-1} * (s_{m-1} - M + 2) + \left(\sum_{i=0}^{m-2} 2^{v_i}\right) - 1,$$

$v_i = s_{m-1} - s_i - 1$ or $v_i = M - 1 + s_i - s_{m-1}$.

Herein $s_i$ is an index of the resource allocated to the UE, and i=0, 1 ... m−1, and m is the number of the resources allocated to the UE, and $s_i < s_{i+1}$ is met.

$R=(r+C) \bmod((N-M+2)*2^{M-1}-1)$, herein C is a constant.

Or, when $$s_{m-1} < M - 1, r = \left(\sum_{i=0}^{M-1} 2^{s_i}\right) - 1;$$

when $$s_{m-1} \geq M - 1, r = 2^{M-1} * (s_{m-1} - M + 2) + \left(\sum_{i=0}^{m-2} 2^{v_i}\right) - 1,$$

$v_i = s_{m-1} - s_i - 1$ or $v_i = M - 1 + s_i - s_{m-1}$.

Herein, $s_i$ is an index of the resource allocated to the UE, and i=0, 1 ... m−1, and m is the number of the resources allocated to the UE, and $s_i < s_{i+1}$ is met.

$R=(r+C) \bmod((N-M+2)*2^{M-1}-1)$, herein C is a constant.

(3) When $$x \leq N - M, r = 2^{M-1} * x + \left(\sum_{i=0}^{M-1} b_i \cdot 2^{i-1}\right).$$

Herein x is an index of a starting resource allocated to the UE, and $b_1, b_2, \ldots, b_{M-1}$ are binary bits obtained by performing a bitmap mapping on resources of which indexes are $x+1, x+2, \ldots, x+M-1$.
When $$x > N - M, r = 2^{M-1} * (N - M + 1) + \left(\sum_{i=0}^{M-1} b_i * 2^{i-1}\right) - 1.$$

Herein $b_1, b_2, \ldots, b_{M-1}$ are corresponding binary bits obtained by performing the bitmap mapping on resources of which indexes are $N-M+1, \ldots, N-1$.
$R=(r+C)\bmod((N-M+2)*2^{M-1}-1)$, herein C is a constant.
Or, when $$x < N - M, r = 2^{M-1} * x + \left(\sum_{i=1}^{M-1} b_i * 2^{i-1}\right);$$

herein x is the index of the starting resource allocated to the UE, and $b_1, b_2, \ldots, b_{M-1}$ are the binary bits obtained by performing the bitmap mapping on the resources of which indexes are $x+1, x+2, \ldots, x+M-1$;
when $$x \geq N - M, r = 2^{M-1} * (N - M) + \left(\sum_{i=1}^{M} b_i * 2^{i-1}\right) - 1;$$

herein $b_1, b_2, \ldots, b_M$ are binary bits obtained by performing the bitmap mapping on resources of which indexes are $N-M, N-M+1, \ldots, N-1$; and
$R=(r+C)\bmod((N-M+2)*2^{M-1}-1)$, herein C is a constant.
(4) When $$x \leq M - 1, r = \left(\sum_{i=0}^{M-1} b_i * 2^i\right) - 1.$$

Herein, x is a maximum index of resources allocated to the UE, and $b_0, b_1, b_2, \ldots, b_{M-1}$ are binary bits obtained by performing bitmap mapping on resources of which indexes are $0, 1, \ldots, M-1$.
When $$x > M - 1, r = 2^{M-1} * (x - M + 2) + \left(\sum_{i=0}^{M-2} b_i * 2^i\right) - 1.$$

Herein, $b_0, b_1, b_2, \ldots, b_{M-2}$ are binary bits obtained by performing the bitmap mapping on resources of which indexes are $x-M+1, x-M+2, \ldots, x-1$.
$R=(r+C)\bmod((N-M+2)*2^{M-1}-1)$, herein C is a constant.
Or, when $$x < M - 1, r = \left(\sum_{i=0}^{M-2} b_i * 2^i\right) - 1;$$

herein x is a maximum value of resource indexes allocated to the UE, and $b_0, b_1, b_2, \ldots, b_{M-2}$ are binary bits obtained by performing the bitmap mapping on resources of which indexes are $0, 1, \ldots, M-2$;
when $$x \geq M - 1, r = 2^{M-1} \times (x - M + 2) + \left(\sum_{i=0}^{M-2} b_i * 2^i\right) - 1;$$

herein $b_0, b_1, b_2, \ldots, b_{M-2}$ are the binary bits obtained by performing the bitmap mapping on the resources of which indexes are $x-M+1, x-M+2, \ldots, x-1$; and
$R=(r+C)\bmod((N-M+2)*2^{M-1}-1)$, herein C is a constant.
In an exemplary embodiment, that the resource allocation is indicated includes: indicating the resource allocation by adopting the binary number, including: indicating m continuous resources allocated to the UE by adopting the binary number, herein $1 \leq m \leq M$, and the binary number is obtained by converting a decimal number r or obtained by converting a decimal number R which is obtained according to r, and the r and the R are one of the followings.
(5) When $x \leq N-M$, $r=x \times M+L-1$.
Herein, x is an index of a starting resource allocated to the UE, and L is the number of resources allocated to the UE.
When $$x > N - M, r = (N - M + 1) \times M + \sum_{i=0}^{N-1-x} (i) + L - 1.$$

$$R = (r + C)\bmod\left(M \times (N - M + 1) + \frac{M(M-1)}{2}\right),$$

herein C is a constant.
Or, when $x<N-M$, $r=x \times M+L-1$;
herein x is an index of a starting resource allocated to the UE, and L is the number of resources allocated to the UE;
when $$x \geq N - M, r = (N - M) \times M + \sum_{i=0}^{N-1-x} (i) + L - 1; \text{ and}$$

$$R = (r + C)\bmod\left(M \times (N - M + 1) + \frac{M(M-1)}{2}\right),$$

herein C is a constant.
(6) When $x \leq H-1$, $r=\Sigma_{i=0}^{x}(i)+L-1$.
Herein, x is a maximum index of the resources allocated to the UE, and L is the number of the resources allocated to the UE.
When $$x > M - 1, r = \frac{M \times (M+1)}{2} + (x - M) \times M + L - 1.$$

$$R = (r + C)\bmod\left(M \times (N - M + 1) + \frac{M(M-1)}{2}\right),$$

herein C is a constant.

Or, when x<M−1, $r=\sum_{i=0}^{x}(i)+L-1$;

herein x is a maximum index of resources allocated to the UE, and L is the number of the resources allocated to the UE. When $$x \geq M - 1, r = \frac{M \times (M - 1)}{2} + (x - M + 1) \times M + L - 1.$$

$$R = (r + C) \mod \left( M \times (N - M + 1) + \frac{M(M - 1)}{2} \right),$$

herein C is a constant.

(7) r=N(L−1)+x, 1≤L≤M, herein x is an index of a starting resource allocated to the UE, and L is the number of the resources allocated to the UE, and N is a positive integer and N∈{15, 25, 50, 75, 100}, and M is a positive integer no more than 7.

In an exemplary embodiment, for the abovementioned (1)~(4), the number of the required indication bits may be $Q=\lceil\log_2((N-M+2)*2^{M-1}-1)\rceil$.

In an exemplary embodiment, for the abovementioned (5)~(7), the number of the required indication bits is $$Q = \left\lceil \log_2 \left( M \times (N - M + 1) + \frac{M(M - 1)}{2} \right) \right\rceil.$$

Figure 2:
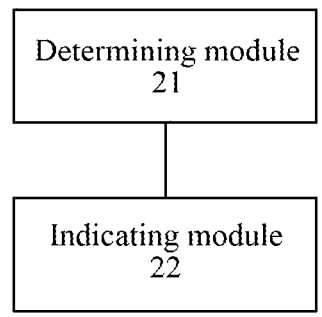
FIG. 2 is a schematic diagram of a device for indicating a resource allocation according to an embodiment of the present disclosure.

As shown in FIG. 2, a device for indicating a resource allocation includes a determining module 21 and an indicating module 22.

The determining module 21 is configured to determine a number of required indication bits according to the following parameters:

a number N of allocable resources in a system, and a maximum number M of allocated resources supported by UE, herein 2≤M<N.

The indicating module 22 is configured to indicate the resource allocation by adopting a binary number, herein a bit number of the binary number is equal to the determined number of the indication bits.

In an exemplary embodiment, the indicating module 22 is configured to indicate one or more in any M continuous resources by adopting the binary number, herein the binary number is obtained by converting a decimal number r or obtained by converting a decimal number R which is obtained according to r, and the r and the R are one of the followings.

(1) When $$s_0 \leq N - M, r = 2^{M-1} \times s_0 + \left( \sum_{i=1}^{m-1} 2^{v1_i} \right),$$

and $v1_i$ and $s_i-s_0$ are in a predetermined one-to-one corresponding relationship and $v1_i \in \{0, 1, 2, \ldots, M-2\}$.

when $$s_0 > N - M, r = 2^{M-1} \times (N - M + 1) + \left( \sum_{i=0}^{m-1} 2^{v2_i} \right) - 1,$$

and $v2_i$ and $s_i-N$ are in a predetermined one-to-one corresponding relationship and $v2_i \in \{0, 1, 2, \ldots, M-2\}$.

Herein $s_i$ is an index of a resource allocated to the UE, and i=0, 1 . . . m−1, and m is a number of resources allocated to the UE, and $s_i<s_{i+1}$ is met.

R=(r+C)mod((N−M+2)*$2^{M-1}$−1), herein C is a constant, and "mod" represents a modulo operation;

Or, when $$s_0 < N - M, r = 2^{M-1} \times s_0 + \left( \sum_{i=1}^{m-1} 2^{v3_i} \right),$$

and $v3_i$ and $s_i-s_0$ are in a predetermined one-to-one corresponding relationship, and $v3_i \in \{0, 1, 2, \ldots, M-2\}$;

when $$s_0 \geq N - M, r = 2^{M-1} * (N - M) + \left( \sum_{i=0}^{m-1} 2^{v4_i} \right) - 1,$$

and $v4_i$ and $s_i-N$ are in a predetermined one-to-one corresponding relationship and $v4_i \in \{0, 1, 2, \ldots, M-1\}$; and R=(r+C)mod((N−M+2)*$2^{M-1}$−1), herein C is a constant.

Furthermore, $v1_i=s_i-s_0-1$ and $v2_i=s_i-N+M-1$ or $v2_i=N-1-s_i$; and $v3_i=s_i-s_0-1$, and $v4_i=s_i-N+M$ or $v4_i=N-1-s$.

(2) When $$s_{m-1} \leq M - 1, r = \left( \sum_{i=0}^{m-1} 2^{s_i} \right) - 1.$$

When $$s_{m-1} > M - 1, r = 2^{M-1} * (s_{m-1} - M + 2) + \left( \sum_{i=0}^{m-2} 2^{v5_i} \right) - 1,$$

and $v5_i$ and $s_{m-1}-s_i$ are in a predetermined one-to-one corresponding relationship and $v5_i \in \{0, 1, 2, \ldots, M-2\}$.

Herein, $s_i$ is an index of a resource allocated to the UE, and i=0, 1 . . . m−1, and m is the number of the resources allocated to the UE, and $s_i<s_{i+1}$ is met.

R=(r+C)mod((N−M+2)*$2^{M-1}$−1), herein C is a constant.

Or, when $$s_{m-1} < M - 1, r = \left( \sum_{i=0}^{m-1} 2^{s_i} \right) - 1;$$

when $$s_{m-1} \geq M - 1, r = 2^{M-1} * (s_{m-1} - M + 2) + \left( \sum_{i=0}^{m-2} 2^{v6_i} \right) - 1,$$

and v6$_i$ and s$_i$-s$_{m-1}$ are in a predetermined one-to-one corresponding relationship and v6$_i \in \{0, 1, 2, \ldots, M-2\}$;

herein s$_i$ is an index of a resource allocated to the UE, and i=0, 1 ... m-1, and m is the number of the resources allocated to the UE, and s$_i$<s$_{i+1}$ is met; and R=(r+C)mod((N-M+2)*$2^{M-1}$-1), herein C is a constant.

Furthermore, v5$_i$=s$_{m-1}$-s$_i$-1 or v5$_i$=M-1+s$_i$-s$_{m-1}$; and v6$_i$=s$_{m-1}$-s-1 or v6$_i$=M-1+s$_i$-s$_{m-1}$.

(3) When $$x \leq N - M, r = 2^{M-1} * x + \left(\sum_{i=1}^{M-1} b_i * 2^{i-1}\right).$$

Herein, x is an index of a starting resource allocated to the UE, and b$_1$, b$_2$, ..., b$_{M-1}$ are binary bits obtained by performing bitmap mapping on resources of which indexes are x+1, x+2, ..., x+M-1.

When $$x > N - M, r = 2^{M-1} * (N - M + 1) + \left(\sum_{i=1}^{M-1} b_i * 2^{i-1}\right) - 1.$$

Herein b$_1$, b$_2$, ..., b$_{M-1}$ are corresponding binary bits obtained by performing the bitmap mapping on resources of which indexes are N-M+1, ..., N-1.

R=(r+C)mod((N-M+2)*$2^{M-1}$-1), herein C is a constant.

Or, when $$x < N - M, r = 2^{M-1} * x + \left(\sum_{i=1}^{M-1} b_i * 2^{i-1}\right);$$

herein x is an index of a starting resource allocated to the UE, and b$_1$, b$_2$, ..., b$_{M-1}$ are the binary bits obtained by performing the bitmap mapping on the resources of which indexes are x+1, x+2, ..., x+M-1;

when $$x \geq N - M, r = 2^{M-1} * (N - M) + \left(\sum_{i=1}^{M} b_i * 2^i\right) - 1;$$

herein b$_1$, b$_2$, ..., b$_M$ are binary bits obtained by performing the bitmap mapping on resources of which indexes are N-M, N-M+1, ..., N-1; and R=(r+C)mod((N-M+2)*$2^{M-1}$-1), herein C is a constant.

(4) When $$x \leq M - 1, r = \left(\sum_{i=0}^{M-1} b_i * 2^i\right) - 1.$$

Herein, x is a maximum index of resources allocated to the UE, and b$_0$, b$_1$, b$_2$, ..., b$_{M-1}$ are binary bits obtained by performing the bitmap mapping on resources of which indexes are 0, 1, ..., M-1.

When $$x > M - 1, r = 2^{M-1} * (x - M + 2) + \left(\sum_{i=0}^{M-2} b_i * 2^i\right) - 1.$$

Herein, b$_0$, b$_1$, b$_2$, ..., b$_{M-2}$ are binary bits obtained by performing the bitmap mapping on resources of which indexes are x-M+1, x-M+2, ..., x-1.

R=(r+C)mod((N-M+2)*$2^{M-1}$-1), herein C is a constant.

Or, when $$x < M - 1, r = \left(\sum_{i=0}^{M-2} b_i * 2^i\right) - 1;$$

herein x is a maximum value of indexes of the resources allocated to the UE, and b$_0$, b$_1$, b$_2$, ..., b$_{M-2}$ are binary bits obtained by performing the bitmap mapping on resources of which indexes are 0, 1, ..., M-2;

when $$x \geq M - 1, r = 2^{M-1} \times (x - M + 2) + \left(\sum_{i=0}^{M-2} b_i * 2^i\right) - 1;$$

herein b$_0$, b$_1$, b$_2$, ..., b$_{M-2}$ are the binary bits obtained by performing the bitmap mapping on the resources of which indexes are x-M+1, x-M+2, ..., x-1; and R=(r+C)mod((N-M+2)*$2^{M-1}$-1), herein C is a constant.

In an exemplary embodiment, the indicating module 22 is configured to indicate m continuous resources allocated to the UE by adopting the binary number, herein 1≤m≤1, and the binary number is obtained by converting a decimal number r or obtained by converting a decimal number R which is obtained according to r, and the r and the R are any one of the followings.

(5) When x≤N-M, r=x×M+L-1.

Herein, x is an index of a starting resource allocated to the UE, and L is the number of the resources allocated to the UE.

When $$x > N - M, r = (N - M + 1) \times M + \sum_{i=0}^{N-1-x} (i) + L - 1.$$

$$R = (r + C) \bmod \left(M \times (N - M + 1) + \frac{M(M-1)}{2}\right),$$

herein C is a constant;

Or, when x<N-M, r=x×M+L-1;

herein x is an index of a starting resource allocated to the UE, and L is the number of the resources allocated to the UE;

$$x \geq N - M, r = (N - M) \times M + \sum_{i=0}^{N-1-x} (i) + L - 1; \text{ and}$$

$$R = (r + C) \bmod \left(M \times (N - M + 1) + \frac{M(M-1)}{2}\right),$$

when
herein C is a constant.

(6) When $x \leq M-1$, $r = \sum_{i=0}^{x}(i) + L - 1$.

Herein x is a maximum index of resources allocated to the UE, and L is the number of the resources allocated to the UE. When $$x > M - 1, r = \frac{M \times (M+1)}{2} + (x - M) \times M + L - 1.$$

$$R = (r + C) \bmod \left( M \times (N - M + 1) + \frac{M(M-1)}{2} \right),$$

herein C is a constant.

Or, when $x < M-1$, $r = \sum_{i=0}^{x}(i) + L - 1$;

herein x is a maximum index of resources allocated to the UE, and L is the number of the resources allocated to the UE; when $$x \geq M - 1, r = \frac{M \times (M-1)}{2} + (x - M + 1) \times M + L - 1; \text{ and}$$

$$R = (r + C) \bmod \left( M \times (N - M + 1) + \frac{M(M-1)}{2} \right),$$

herein C is a constant.

(7) $r = N(L-1) + x$, $1 \leq L \leq M$. Herein x is an index of a starting resource allocated to the UE, and L is the number of the resources allocated to the UE, and N is a positive integer and $N \in \{15, 25, 50, 75, 100\}$, and M is a positive integer no more than 7.

For the abovementioned (1)~(4), the number, determined by the determining module, of the required indication bits is $Q = \lceil \log_2((N-M+2) \times 2^{M-1} - 1) \rceil$.

For the abovementioned (5)~(7), the number, determined by the determining module, of the required indication bits is $$Q = \left\lceil \log_2 \left( M \times (N - M + 1) + \frac{M(M-1)}{2} \right) \right\rceil.$$

Embodiment One

An embodiment of the present disclosure provides a method for indicating a resource allocation. For example, the resources are RBs or carrier resources in an LTE system, or may be time-domain resources such as sub-frames or frames, or may be code resources, or may be any combination of the above resources. Descriptions are made in the embodiment of the present disclosure with resource allocation of RBs in the LTE. A practical application is not limited to allocation of RBs.

The method for indicating the resource allocation in the embodiment is adopted to indicate one or more in any M (M<N) continuous resources in N resources. Here, 'continuous' refers to logically continuous. The M logically continuous resources correspond to M physical resources in the one-to-one manner, and the corresponding physical resources may be continuous, and may also be discontinuous. For example, supposed that M=3 and virtual resources 0, 1 and 2 correspond PRBs 1, 5 and 7 in the one-to-one manner respectively, and the three continuous virtual resource blocks correspond to the three physically discontinuous PRBs.

The method for indicating the resource allocation in the embodiment will be described below with allocation of RBs on the physical layer.

Supposed that a number of allocable RBs in a system is N, and indexes of RBs are sequentially 0, 1, 2, . . . , N−1, and here, the number of the allocable RBs in the system may be equal to an RB number corresponding to a system bandwidth, and may also be smaller than the RB number corresponding to the system bandwidth. For example, the system bandwidth is 20 MHz, while the number of the allocable RBs may be only a part therein, for example, RB#0~RB#39. A maximum number of allocated RBs supported by UE is M, and M<N and M≥2. The method for indicating the resource allocation may allocate any one or more in any M continuous RBs to the UE. Here, 'continuous' refers to logically continuous, and physical resources may be continuous, and may also be discontinuous. The method for indicating the resource allocation may also be adopted to allocate any m logically continuous RBs to the UE, herein 1≤m≤M. The number of bits required by the method for indicating the resource allocation is $Q = \lceil \log((N-M+2) \times 2^{M-1} - 1) \rceil$, where $\lceil \cdot \rceil$ represents rounding up. Supposed that the number of RBs allocated to the MTC UE is m, and 1≤m≤M, and indexes of the m RBs are $s_i$ (i=0, 1 . . . m−1), and $s_i < s_i + 1$ is met. For example, the indexes of the RBs allocated to the UE are 7, 8 and 10, and then $s_0 = 7$, $s_1 = 8$ and $s_2 = 10$.

The resource allocation corresponds to a decimal number r.

When $s_0 \leq N-M$, $$r = 2^{M-1} \times w + \left( \sum_{i=1}^{m-1} 2^{v_i} \right), v_i = s_i - s_0 - 1$$

and $w = s_0$.

Here, $v_i = s_i - s_0 - 1$ is an example only, and it may also be $v_i = M - s_i + s_0 - 1$ or other else as long as $v_i$ and $s_i - s_0$ are in a one-to-one corresponding relationship and $v_i \in \{0, 1, 2 \ldots, M-2\}$. Such a corresponding relationship is preset. $w = s_0$ is also an example only, and it may also be $w = N - M - s_0$ or another form as along as w and $s_0$ are in a one-to-one corresponding relationship, and $w \in \{0, 1, 2, \ldots, N-M\}$. The abovementioned formula has the first part only when m=1, that is, $r = 2^{M-1} \times s_0$.

When $$s_0 > N - M,$$

$$r = 2^{M-1} \times (N - M + 1) + \left( \sum_{i=0}^{m-1} 2^{v_i} \right) - 1, v_i = s_i - N + M - 1 \text{ or}$$

$$v_i = N - 1 - s_i.$$

Here, $v_i = s_i - N + M - 1$ is an example only, and it may also be $v_i = N - 1 - s_i$ or other else as long as $v_i$ and $s_i - N$ are a one-to-one corresponding relationship and $v_i \in \{0, 1, 2 \ldots, M-2\}$. Such a corresponding relationship is preset.

The abovementioned formulae are represented under two conditions: $s_0 \leq N-H$ and $s_0 > N-1$, and the equal sign may practically be placed at the side of $s_0 > N-M$, and the corresponding formula is given below.

When $$s_0 < N - M,$$

$$r = 2^{M-1} \times w + \left(\sum_{i=1}^{m-1} 2^{v_i}\right), v_i = s_i - s_0 - 1 \text{ and } w = s_0.$$

Here, $v_i = s_i - s_0 - 1$ is an example only, and it may also be $v_i = M - s_i - s_0 - 1$ or other else as long as $v_i$ and $s_i - s_0$ are in a one-to-one corresponding relationship and $v_i \in \{0, 1, 2 \ldots, M-2\}$. Such a corresponding relationship is preset. $w = s_0$ is also an example only, and another form may also be adopted as long as $w$ and $s_0$ are in a one-to-one corresponding relationship, and $w \in \{0, 1, 2, \ldots, N-M-1\}$.

When $$s_0 \geq N - M,$$

$$r = 2^{M-1} * (N - M) + \left(\sum_{i=0}^{m-1} 2^{v_i}\right) - 1, v_i = s_i - N + M \text{ or}$$

$$v_i = N - 1 - s_i.$$

Here, $v_i = s_i - N + M$ is an example only, and it may also be $v_i = N - 1 - s_i$ or other else as long as $v_i$ and $s_i - N$ are in a one-to-one corresponding relationship and $v_i \in \{0, 1, 2 \ldots, M-1\}$. Such a corresponding relationship is preset.

Practically, an eNB may notify the UE of a Qbit binary number corresponding to the decimal number. If the binary number is $c_0, c_1, \ldots, c_{Q-1}$, then $$r = \sum_{i=0}^{Q-1} c_i \cdot 2^i.$$

For example, $r=15$, $Q=8$, and then the corresponding binary number is 00001111.

The abovementioned method for indicating the resource allocation may be transformed to form a new method for indicating a resource allocation. If the resource allocation in the new method for indicating the resource allocation is represented by a decimal number R, then $R=(r+C)\bmod((N-M+2)*2^{M-1}-1)$. Herein "mod" represents a modulo operation, and a value of r is mentioned above. The eNB may notify the UE of a Qbit binary number corresponding to the decimal number, as mentioned above, which will not be elaborated repeatedly.

The eNB determines a decimal number according to the abovementioned method, and then sends a binary number corresponding to the decimal number to the UE. After receiving it, the UE determines RBs allocated to the UE by the eNB according to the binary number.

Embodiment Two

The embodiment solves the same problem as the embodiment one. Supposed that a number of allocable RBs in a system is N, and indexes of RBs are sequentially 0, 1, 2, ..., N-1, and a maximum number of allocated RBs supported by UE is M, and M<N and M≥2. A method for indicating a resource allocation may allocate any one or more in any M continuous RBs to the UE. Here, 'continuous' refers to logically continuous, and physical resources may be continuous, and may also be discontinuous. The method for indicating the resource allocation may also be adopted to allocate any m continuous RBs to the UE, herein 1≤m≤M. The number of bits required by the method for indicating the resource allocation is $Q=\|\log_2((N-M+2)*2^{m-1}-1)$. Supposed that a number of RBs allocated to the MTC UE is m, and 1≤m≤M, and indexes of the m RBs are $s_i$ (i=0, 1 ... m-1), and $s_i < s_i + 1$ is met. The resource allocation corresponds to a decimal number r.

When $$s_{m-1} \leq M - 1,$$

$$r = \left(\sum_{i=0}^{m-1} 2^{s_i}\right) - 1.$$

When $$s_{m-1} > M - 1,$$

$$r = 2^{M-1} * w + \left(\sum_{i=0}^{m-2} 2^{v_i}\right) - 1, v_i = s_{m-1} - s_i - 1 \text{ or}$$

$$v_i = M - 1 + s_i - s_{m-1} \text{ and } w = s_{m-1} - M + 2.$$

Herein, $s_i$ is an index of a resource allocated to the UE, and i=0, 1 ... m-1, and m is the number of the resources allocated to the UE, and $s_i < s_{i+1}$ is met.

Herein, $v_i = s_{m-1} - s_i - 1$ is an example only as long as $v_i$ and $s_{m-1} - s_i$ are in a one-to-one corresponding relationship and $v_i \in \{0, 1, 2 \ldots, M-2\}$. The corresponding relationship is preset. $w = s_{m-1} - M + 2$ is also an example only, and another form may also be adopted as along as $w$ and $s_{m-1}$ are in a one-to-one corresponding relationship, and $w \in \{2, 3, \ldots, N-M+1\}$. When m=1, the abovementioned calculation formula for r does not include the part $$\left(\sum_{i=0}^{m-2} 2^{v_i}\right),$$

and $r = 2^{M-1} * w - 2$.

The abovementioned formulae are represented under two conditions: $s_{m-1} \leq M-1$ and $s_{m-1} > M-1$, and the equal sign may practically be placed at the side of $s_{m-1} > M-1$, and the corresponding formula is given below.

When $$s_{m-1} < M - 1,$$

$$r = \left(\sum_{i=0}^{m-1} 2^{s_i}\right) - 1.$$

When $$s_{m-1} \geq M - 1,$$

$$r = 2^{M-1} * w + \left(\sum_{i=0}^{m-2} 2^{v_i}\right) - 1,$$

$$v_i = s_{m-1} - s_i - 1 \text{ or}$$

$$v_i = M - 1 + s_i - s_{m-1} \text{ and}$$

$$w = s_{m-1} - M + 2.$$

Herein, $s_i$ is an index of a resource allocated to the UE, and i=0, 1 . . . m−1, and m is the number of the resources allocated to the UE, and $s_i < s_{i+1}$ is met.

Herein, $v_i = M-1+s_i-s_{m-1}$ is an example only as long as $v_i$ and $s_i-s_{m-1}$ are in a one-to-one corresponding relationship and $v_i$ {0, 1, 2 . . . , M−2}. The corresponding relationship is preset. When m=1, the abovementioned calculation formula for r does not include the part $$\left(\sum_{i=0}^{m-2} 2^{v_i}\right),$$

and $r=2^{M-1}*w-2$.

Practically, an eNB may notify the UE of a Qbit binary number corresponding to the decimal number. If the binary number is $c_0, c_1, \ldots, c_{Q-1}$, then $$r = \sum_{i=0}^{Q-1} c_i \cdot 2^i.$$

For example, r=15, Q=8, and then the corresponding binary number is 00001111.

The abovementioned method for indicating the resource allocation may be transformed to form a new method for indicating a resource allocation. If the resource allocation in the new method for indicating the resource allocation is represented by a decimal number R, then $R=(r+C) \bmod ((N-M+2)*2^{M-1}-1)$, herein a value of r is mentioned above. The eNB may notify the UE of a Qbit binary number corresponding to the decimal number, as mentioned above, which will not be elaborated repeatedly.

The eNB determines a decimal number according to the abovementioned method, and then sends a binary number corresponding to the decimal number to the UE. After receiving it, the UE determines RBs allocated to the UE by the eNB according to the binary number.

Embodiment Three

The embodiment solves the same problem as the embodiment one. Supposed that a number of allocable RBs in a system is N, and indexes of RBs are sequentially 0, 1, 2, . . . , N−1, and a maximum number of allocated RBs supported by UE is M, and M<N and M≥2. A method for indicating a resource allocation may allocate any one or more in any M continuous RBs to the UE. Here, 'continuous' refers to logically continuous, and physical resources may be continuous, and may also be discontinuous. The method for indicating the resource allocation may also be adopted to allocate any m continuous RBs to the UE, herein 1≤m≤M. The number of bits required by the method for indicating the resource allocation is $Q=|\log_2((N-M+2)*2^{M-1}-1)|$. Supposed that a minimum index of the RBs allocated to the MTC UE is x.

When x≤N−M, bitmap mapping is performed on RBs of which indexes are x+1, x+2, . . . , x+M−1, and the RBs which are allocated to the MTC UE correspond to "1", and the RBs which are not allocated to the MTC UE correspond to "0". Corresponding binary bits are set to be $b_1, b_2, \ldots, b_{M-1}$. Each RB of RBs of which indexes are x+1, x+2, . . . , x+M−1 corresponds to each bit in the binary $b_1, b_2, \ldots, b_{M-1}$ in a one-to-one manner, and a corresponding relationship is preset. For example, x+i corresponds to $b_i$, or x+i may also correspond to $b_{M-1-i}$. A practical application is not limited to such a corresponding manner as long as they are in the one-to-one relationship.

The resource allocation corresponds to a decimal number r:

$$r = 2^{M-1} * x + \left(\sum_{i=1}^{M-1} b_i * 2^{i-1}\right).$$

When x>N−M, bitmap mapping is performed on RBs of which indexes are N−M+1, . . . , N−1, and the RBs which are allocated to the MTC UE correspond to "1", and the RBs which are not allocated to the MTC UE correspond to "0". Corresponding binary bits are set to be: $b_1, b_2, \ldots, b_{M-1}$. The RBs of which indexes are N−M+1, . . . , N−1 correspond to each bit in the binary $b_1, b_2, \ldots, b_{M-1}$ in a one-to-one manner, and the corresponding relationship is preset.

The resource allocation corresponds to a decimal number r:

$$r = 2^{M-1} * (N - M + 1) + \left(\sum_{i=1}^{M-1} b_i * 2^{i-1}\right) - 1.$$

The abovementioned formulae are represented under two conditions: x≤N−M and x>N−M, and the equal sign may practically be placed at the side of x>N−M, and the corresponding formula is given below.

When x<N−M, bitmap mapping is performed on the RBs of which indexes are x+1, x+2, . . . , x+M−1, and the RBs which are allocated to the MTC UE correspond to "1", and the RBs which are not allocated to the MTC UE correspond to "0". The corresponding binary bits are set to be: $b_1, b_2, \ldots, b_{M-1}$. Each RB of RBs of which indexes are x+1, x+2, . . . , x+M−1 corresponds to each bit in the binary $b_1, b_2, \ldots, b_{M-1}$ in a one-to-one manner, and the corresponding relationship is preset. For example, x+i corresponds to $b_i$, or x+i may also correspond to $b_{M-1-i}$. The practical application is not limited to such a corresponding manner as long as they are in the one-to-one corresponding relationship.

The resource allocation corresponds to the decimal number r:

$$r = 2^{M-1} * x + \left(\sum_{i=1}^{M-1} b_i * 2^{i-1}\right).$$

When x≥N−M, bitmap mapping is performed on RBs of which indexes are N−M, N−M+1, . . . , N−1, and the RBs which are allocated to the MTC UE correspond to "1", and the RBs which are not allocated to the MTC UE correspond to "0". Corresponding binary bits are set to be: $b_1, b_2, \ldots, b_M$. The RBs of which indexes are N−M, N−M+1, . . . , N−1 correspond to each bit in the binary $b_1, b_2, \ldots, b_{M-1}$ in a one-to-one manner, and the corresponding relationship is preset.

The resource allocation corresponds to a decimal number r:

$$r = 2^{M-1} * (N-M) + \left(\sum_{i=1}^{M} b_i * 2^{i-1}\right) - 1.$$

Practically, an eNB may notify the UE of a Qbit binary number corresponding to the decimal number. If the binary number is $c_0, c_1, \ldots, c_{Q-1}$, the $$r = \sum_{i=0}^{Q-1} c_i \cdot 2^i.$$

For example, r=15, Q=8, and then the corresponding binary number is 00001111.

The abovementioned method for indicating the resource allocation may be transformed to form a new method for indicating a resource allocation. If the resource allocation in the new method for indicating the resource allocation is represented by a decimal number R, then R=(r+C)mod((N−M+2)*$2^{M-1}$−1), herein a value of r is mentioned above. The eNB may notify the UE of a Qbit binary number corresponding to the decimal number, as mentioned above, which will not be elaborated repeatedly.

The eNB determines a decimal number according to the abovementioned method, and then sends a binary number corresponding to the decimal number to the UE. After receiving it, the UE determines RBs allocated to the UE by the eNB according to the binary number.

Embodiment Four

The embodiment solves the same problem as the embodiment one. Supposed that a number of allocable RBs in a system is N, and indexes of RBs are sequentially 0, 1, 2, . . . , N−1, and a maximum number of allocated RBs supported by UE is M, and M<N and M≥2. A method for indicating a resource allocation may allocate any one or more in any M continuous RBs to the UE. Here, 'continuous' refers to logically continuous, and physical resources may be continuous, and may also be discontinuous. The method for indicating the resource allocation may also be adopted to allocate any m continuous RBs to the UE, herein 1≤m≤M. The number of bits required by the method for indicating the resource allocation is Q=⌈$\log_2$((N−M+2)*$2^{M-1}$−1). Supposed that a maximum index of the RBs allocated to the MTC UE is x.

When x≤M−1, bitmap mapping is performed on RBs of which indexes are 0, 1, . . . , M−1, and the RBs which are allocated to the MTC UE correspond to "1", and the RBs which are not allocated to the MTC UE correspond to "0". Corresponding binary bits are set to be: $b_0, b_1, b_2, \ldots, b_{M-1}$. Each RB of the RBs of which indexes are 0, 1, . . . , M−1 correspond to each bit in the binary $b_0, b_1, b_2, \ldots, b_{M-1}$ in a one-to-one manner, and a corresponding relationship is preset.

The resource allocation corresponds to a binary number r:

$$r = \left(\sum_{i=0}^{M-1} b_i * 2^i\right) - 1.$$

When x>M−1, bitmap mapping is performed on RBs of which indexes are x−M+1, x−M+2, . . . , x−1, and the RBs which are allocated to the MTC UE correspond to "1", and the RBs which are not allocated to the MTC UE correspond to "0". Corresponding binary bits are set to be: $b_0, b_1, b_2, \ldots, b_{M-1}$. Each RB of RBs of which indexes are x−M+1, x−M+2, . . . , x−1 correspond to each bit in the binary $b_0, b_1, b_2, \ldots, b_{M-2}$ in a one-to-one manner, and a corresponding relationship is preset. A practical application is not limited to a certain corresponding manner as long as they are in the one-to-one corresponding relationship.

The resource allocation corresponds to a decimal number r:

$$r = 2^{M-1} * (x - M + 1) + \left(\sum_{i=0}^{M-2} b_i * 2^i\right) - 1.$$

The abovementioned formulae are represented under two conditions: x≤M−1 and x>M−1, and the equal sign may practically be placed at the side of x>M−1, and the corresponding formula is given below.

When x<M−1, bitmap mapping is performed on RBs of which indexes are 0, 1, . . . , M−2, and the RBs which are allocated to the MTC UE correspond to "1", and the RBs which are not allocated to the MTC UE correspond to "0". Corresponding binary bits are set to be: $b_0, b_1, b_2, \ldots, b_{M-2}$. Each RB of the RBs of which indexes are 0, 1, . . . , M−2 correspond to each bit in the binary $b_0, b_1, b_2, \ldots, b_{M-2}$ in a one-to-one manner, and a corresponding relationship is preset.

The resource allocation corresponds to the decimal number r:

$$r = \left(\sum_{i=0}^{M-2} b_i * 2^i\right) - 1.$$

When x≥M−1, bitmap mapping is performed on the RBs of which indexes are x−M+1, x−M+2, . . . , x−1, and the RBs which are allocated to the MTC UE correspond to "1", and the RBs which are not allocated to the MTC UE correspond to "0". The corresponding binary bits are set to be: $b_0, b_1, b_2, \ldots, b_{M-2}$. Each RB of RBs of which indexes tare x−M+1, x−M+2, . . . , x−1 correspond to each bit in the binary $b_0, b_1, b_2, \ldots, b_{M-2}$ in a one-to-one manner, and the corresponding relationship is preset. The practical application is not limited to a certain corresponding manner as long as they are in the one-to-one corresponding relationship.

The resource allocation corresponds to a decimal number r:

$$r = 2^{M-1} * (x - M + 2) + \left(\sum_{i=0}^{M-2} b_i * 2^i\right) - 1.$$

Practically, an eNB may notify the UE of a Qbit binary number corresponding to the decimal number. If the binary number is $c_0, c_1, \ldots, c_{Q-1}$, then $$r = \sum_{i=0}^{Q-1} c_i \cdot 2^i.$$

For example, r=15, Q=8, and then the corresponding binary number is 00001111.

The abovementioned method for indicating the resource allocation may be transformed to form a new method for indicating a resource allocation. If the resource allocation in the new method for indicating the resource allocation is represented by a decimal number R, then $R=(r+C)\bmod((N-M+2)*2^{M-1}-1)$, herein a value of r is mentioned above. The eNB may notify the UE of a Qbit binary number corresponding to the decimal number, as mentioned above, which will not be elaborated repeatedly.

The eNB determines a decimal number according to the abovementioned method, and then sends a binary number corresponding to the decimal number to the UE. After receiving it, the UE determines RBs allocated to the UE by the eNB according to the binary number.

Embodiment Five

The embodiment provides a method for indicating a resource allocation. Supposed that a number of allocable RBs in a system is N, and indexes of RBs are sequentially 0, 1, 2, . . . , N−1, and a maximum number of allocated RBs supported by UE is M, and M<N and M≥2. The method for indicating the resource allocation may allocate any m continuous RBs to the UE, herein 1≤m≤M. Here, 'continuous' refers to logically continuous, and physical resources may be continuous, and may also be discontinuous. The number of bits required by the method for indicating the resource allocation is $$Q = \left\lceil \log_2\left(M \times (N - M + 1) + \frac{M(M-1)}{2}\right) \right\rceil.$$

Supposed an index (i.e. minimum index) of a starting RB allocated to the UE is x and a number of RBs allocated to the UE is L, then the resource allocation corresponds to a decimal number r:
when x≤N−M, r=x×M+L−1; and
when x>N−M, r=(N−M+1)×M+$\Sigma_{i=0}^{N-1-x}$(i)+L−1.

The abovementioned formulae are represented under two conditions: x≤N−M and x>N−M, and the equal sign may practically be placed at the side of x>N−M, and the corresponding formula is given below.
When x<N−M, r=x×M+L−1; and
when x≥N−M, r=(N−M)×M+$\Sigma_{i=0}^{N-1-x}$(i)+L−1.

Practically, an eNB may notify the UE of a Qbit binary number corresponding to the decimal number, which is similar to the above embodiments and will not be elaborated repeatedly.

The abovementioned method for indicating the resource allocation may be transformed to form a new method for indicating a resource allocation. If the resource allocation in the new method for indicating the resource allocation is represented by a decimal number R, then $$R = (r + C)\bmod\left(M \times (N - M + 1) + \frac{M(M-1)}{2}\right),$$

herein a value of r is mentioned above. The eNB may notify the UE of a Qbit binary number corresponding to the decimal number, as mentioned above, which will not be elaborated repeatedly.

The eNB determines a decimal number according to the abovementioned method, and then sends a binary number corresponding to the decimal number to the UE. After receiving it, the UE determines RBs allocated to the UE by the eNB according to the binary number.

Embodiment Six

The embodiment provides a method for indicating a resource allocation. Supposed that a number of allocable RBs in a system is N, and indexes of RBs are sequentially 0, 1, 2, . . . , N−1, and a maximum number of allocated RBs supported by UE is M, and M<N and M≥2. The method for indicating the resource allocation may allocate any m continuous RBs to the UE, herein 1≤m≤M. Here, 'continuous' refers to logically continuous, and physical resources may be continuous, and may also be discontinuous. The number of bits required by the method for indicating the resource allocation is $$Q = \left\lceil \log_2\left(M \times (N - M + 1) + \frac{M(M-1)}{2}\right) \right\rceil.$$

Supposed a maximum index of RBs allocated to the UE is x and a number of RBs allocated to the UE is L, then the resource allocation corresponds to a decimal number r:
when x≤M−1, r=$\Sigma_{i=0}^{x}$(i)+L−1; and
when $$x > M - 1, r = \frac{M \times (M+1)}{2} + (x - M) \times M + L - 1.$$

The abovementioned formulae are represented under two conditions: x≤M−1 and x>M−1, and the equal sign may practically be placed at the side of x>M−1, and the corresponding formula is given below.
When x<M−1, r=$\Sigma_{i=0}^{x}$(i)+L−1; and
when $$x \geq M - 1, r = \frac{M \times (M-1)}{2} + (x - M + 1) \times M + L - 1.$$

Practically, an eNB may notify the UE of a Qbit binary number corresponding to the decimal number, which is similar to the above embodiments and will not be elaborated repeatedly.

The abovementioned method for indicating the resource allocation may be transformed to form a new method for indicating a resource allocation. Supposed the resource allocation in the new method for indicating the resource allocation is represented by a decimal number R, then $$R = (r + C) \bmod \left( M \times (N - M + 1) + \frac{M(M-1)}{2} \right),$$

herein a value of r is mentioned above. The eNB may notify the UE of a Qbit binary number corresponding to the decimal number, as mentioned above, which will not be elaborated repeatedly.

The eNB determines a decimal number according to the abovementioned method, and then sends a binary number corresponding to the decimal number to the UE. After receiving it, the UE determines RBs allocated to the UE by the eNB according to the binary number.

Embodiment Seven

The embodiment provides a method for indicating a resource allocation. Supposed that a number of allocable RBs in a system is N, and indexes of RBs are sequentially 0, 1, 2, ..., N−1, and a maximum number of allocated RBs supported by UE is M, and M<N and M>2. The method for indicating the resource allocation may allocate any m continuous RBs to the UE, herein 1≤m≤M. The number of bits required by the method for indicating the resource allocation is $$Q = \left\lceil \log_2 \left( M \times (N - M + 1) + \frac{M(M-1)}{2} \right) \right\rceil.$$

Supposed an index (i.e. a minimum index) of a starting RB allocated to the UE is x and a number of RBs allocated to the UE is L, the resource allocation corresponds to a decimal number r:

$r=N(L-1)+x.$

During indicating of the resource allocation, N may be a positive integer in a set {15, 25, 50, 75, 100}, and M may be a positive integer no more than 7.

The abovementioned method for indicating the resource allocation is transformed to form a new method for indicating a resource allocation. Supposed the resource allocation in the new method for indicating the resource allocation is represented by a decimal number R, then $$R = (r + C) \bmod \left( M \times (N - M + 1) + \frac{M(M-1)}{2} \right),$$

herein a value of r is mentioned above. An eNB may notify the UE of a Qbit binary number corresponding to the decimal number, as mentioned above, which will not be elaborated repeatedly.

In the embodiments of the present disclosure, when the same resource is indicated in a system, and one of r or R is selected for indicating according to a default or predetermined manner, and one of the abovementioned manners is selected to calculate r. That is, when a source in a system is indicated, a uniquely determined manner is adopted to calculate an adopted decimal number.

Those ordinary skilled in the art should know that all or part of the steps of the abovementioned embodiments may be implemented by a flow of a computer program. The computer program may be stored in a computer-readable storage medium. The computer program is executed on a corresponding hardware platform (such as a system, equipment, a device and an apparatus), and during execution, one or combination of the steps of the method embodiments is included.

In an exemplary embodiment, all or part of the steps of the abovementioned embodiments may also be implemented by virtue of an integrated circuit, and these steps are manufactured into integrated circuit modules respectively, or multiple modules or steps therein are manufactured into a single integrated circuit module for implementation.

The devices/function modules/function units in the abovementioned embodiments may be implemented by adopting a universal computing device, and they may be concentrated on a single computing device, and may also be distributed on a network formed by multiple computing devices.

When being implemented in the form of a software function module and sold or used as independent products, the devices/function modules/function units in the abovementioned embodiments may be stored in a computer-readable storage medium. The abovementioned computer-readable storage medium may be a read-only memory, a magnetic disk, an optical disk and the like.

INDUSTRIAL APPLICABILITY

The embodiments of the present disclosure may be applied to indicating an uplink and downlink resource allocation, and can implement flexible scheduling of the UE and relatively low overhead. Moreover, the embodiments of the present disclosure are not limited to allocation of RBs on a physical layer, and may be adopted for allocation of any resources, including frequency-domain resources, or time-domain resources, or code resources or mixtures of the above.

What is claimed is:

1. A method for indicating a resource allocation, comprising:
    an evolved NodeB (eNB) determining required indication bits according to the following parameters:
    a number N of allocable resources in a system, and
    a maximum number M of allocated resources supported by User Equipment, UE, wherein 2≤M<N; and
    the eNB indicating the resource allocation by adopting the indication bits; wherein the method for indicating a resource allocation further comprises: the indication bits are determined according to r, and the r is as follows:
    when x≤N−M, r=x×M+L−1;

wherein x is an index of a starting resource allocated to the UE, and L is a number of resources allocated to the UE; wherein the method implements flexible scheduling of UE, and relatively low overhead.

2. The method according to claim 1, wherein the method for indicating a resource allocation further comprises: the indication bits are determined according to r, and the r is as follows:

when $$s_0 \le N - M, r = 2^{M-1} \times s_0 + \left(\sum_{i=1}^{m-1} 2^{v1_i}\right),$$

and $v1_i$ and $s_i-s_0$ being in a predetermined one-to-one corresponding relationship and $v1_i \in \{0, 1, 2 \ldots, M-2\}$;
when $$s_0 > N - M, r = 2^{M-1} \times (N - M + 1) + \left(\sum_{i=0}^{m-1} 2^{v2_i}\right) - 1,$$

and $v2_i$ and $s_i-N$ being in a predetermined one-to-one corresponding relationship and $v2_i \in \{0, 1, 2 \ldots, M-2\}$,
  wherein $s_i$ is an index of a resource allocated to the UE, and i=0, 1 ... m-1, and m is a number of resources allocated to the UE, and $s_i < s_{i+1}$ is met;
  or,
when $$s_0 < N - M, r = 2^{M-1} \times s_0 + \left(\sum_{i=1}^{m-1} 2^{v3_i}\right),$$

and $v3_i$ and $s_i-s_0$ being in a predetermined one-to-one corresponding relationship and $v3_i \in \{0, 1, 2 \ldots, M-2\}$;
when $$s_0 \ge N - M, r = 2^{M-1} * (N - M) + \left(\sum_{i=0}^{m-1} 2^{v4_i}\right) - 1,$$

and $v4_i$ and $s_i-N$ being in a predetermined one-to-one corresponding relationship and $v4_i \in \{0, 1, 2 \ldots, M-2\}$.

3. The method according to claim 2, wherein $v1_i = s_i - s_0 - 1$, and $v2_i = s_i - N + M - 1$ or $v2_i = N - 1 - s_i$; and $v3_i = s_i - s_0 - 1$, and $v4_i = s_i - N + M$ or $v4_i = N - 1 - s_i$.

4. The method according to claim 1, wherein the method for indicating a resource allocation further comprises: the indication bits are determined according to r, and the r is as follows:
when $$s_{m-1} \le M - 1, r = \left(\sum_{i=0}^{m-1} 2^{s_i}\right) - 1;$$

when $$s_{m-1} > M - 1, r = 2^{M-1} * (s_{m-1} - M + 2) + \left(\sum_{i=0}^{m-2} 2^{v5_i}\right) - 1,$$

and $v5_i$ and $s_{m-1}-s_i$ being in a predetermined one-to-one corresponding relationship and $v5_i \in \{0, 1, 2, \ldots, M-2\}$;
wherein $s_i$ is an index of a resource allocated to the UE, and i=0, 1 ... m-1, and m is a number of resources allocated to the UE, and $s_i < s_{i+1}$ is met; or, when $$s_{m-1} < M - 1, r = \left(\sum_{i=0}^{m-1} 2^{s_i}\right) - 1;$$

when $$s_{m-1} \ge M - 1, r = 2^{M-1} * (s_{m-1} - M + 2) + \left(\sum_{i=0}^{m-2} 2^{v6_i}\right) - 1,$$

and $v6_i$ and $s_i-s_{m-1}$ being in a predetermined one-to-one corresponding relationship, and $v6_i \in \{0, 1, 2, \ldots, M-2\}$;
  wherein $s_i$ is an index of a resource allocated to the UE, and i=0, 1 ... m-1, and m is a number of resources allocated to the UE, and $s_i < s_{i+1}$ is met.

5. The method according to claim 4, wherein $v5_i = s_{m-1} - s_i - 1$ or $v5_i = M - 1 + s_i - s_{m-1}$; and $v6_i = s_{m-1} - s_i - 1$ or $v6_i = M - 1 + s_i - s_{m-1}$.

6. The method according to claim 1, wherein the method for indicating a resource allocation further comprises: the indication bits are determined according to r, and the r is as follows:
when $$x \le N - M, r = 2^{M-1} * x + \left(\sum_{i=1}^{M-1} b_i * 2^{i-1}\right),$$

wherein x is an index of a starting resource allocated to the UE, and $b_1, b_2, \ldots, b_{M-1}$ are binary bits obtained by performing a bitmap mapping on resources of which indexes are x+1, x+2, ..., x+M-1;
when $$x > N - M, r = 2^{M-1} * (N - M + 1) + \left(\sum_{i=1}^{M-1} b_i * 2^{i-1}\right) - 1;$$

wherein $b_1, b_2, \ldots, B_{M-1}$ are corresponding binary bits obtained by performing the bitmap mapping on resources of which indexes are N-M+1, ..., N-1;
or, when $$x < N - M, r = 2^{M-1} * x + \left(\sum_{i=1}^{M-1} b_i * 2^{i-1}\right);$$

wherein x is an index of a starting resource allocated to the UE, and $b_1, b_2, \ldots, b_{M-1}$ are binary bits obtained by performing a bitmap mapping on resources of which indexes are x+1, x+2, ..., x+M-1;
when $$x \ge N - M, r = 2^{M-1} * (N - M) + \left(\sum_{i=1}^{M} b_i * 2^{i-1}\right) - 1,$$

wherein $b_1, b_2, \ldots, b_M$ are binary bits obtained by performing the bitmap mapping on resources of which indexes are N−M, N−M+1, . . . , N−1.

7. The method according to claim 1, wherein the method for indicating a resource allocation further comprises: the indication bits are determined according to r, and the r is as follows:

when $$x \le M - 1, r = \left(\sum_{i=0}^{M-1} b_i * 2^i\right) - 1;$$

wherein x is a maximum index of resources allocated to the UE, and $b_0, b_1, b_2, \ldots, B_{M-1}$ are binary bits obtained by performing a bitmap mapping on resources of which indexes are 0, 1, . . . , M−1;

when $$x > M - 1, r = 2^{M-1} * (x - M + 2) + \left(\sum_{i=0}^{M-2} b_i * 2^i\right) - 1;$$

wherein $b_0, b_1, b_2, \ldots, b_{M-2}$ are binary bits obtained by performing the bitmap mapping on resources of which indexes are x−M+1, x−M+2, . . . , x−1; or, when $$x < M - 1, r = \left(\sum_{i=0}^{M-2} b_i * 2^i\right) - 1;$$

wherein x is a maximum value of indexes of resources allocated to the UE, and $b_0, b_1, b_2, \ldots, b_{M-2}$ are binary bits obtained by performing a bitmap mapping on resources of which indexes are 0, 1, . . . , M−2;

when $$x \ge M - 1, r = 2^{M-1} \times (x - M + 2) + \left(\sum_{i=0}^{M-2} b_i * 2^i\right) - 1;$$

wherein $b_0, b_1, b_2, \ldots, b_{M-2}$ are binary bits obtained by performing the bitmap mapping on resources of which indexes are x−M+1, x−M+2, . . . , x−1.

8. The method according to claim 1, wherein the method for indicating a resource allocation further comprises: the indication bits are determined according to r, and the r is as follows:

when $x \le M-1$, $r=\sum_{i=0}^{x}(i)+L-1$; wherein x is a maximum index of resources allocated to the UE, and L is a number of the resources allocated to the UE; when $$x > M - 1, r = \frac{M \times (M+1)}{2} + (x - M) \times M + L - 1;$$

or, when $x < M - 1, r = \sum_{i=0}^{x}(i) + L - 1;$ wherein x is a maximum index of resources allocated to the UE, and L is a number of the resources allocated to the UE;

when $$x \ge M - 1, r = \frac{M \times (M-1)}{2} + (x - M + 1) \times M + L - 1;$$

and L is a number of RBs allocated to the UE.

9. The method according to claim 1, wherein the method for indicating a resource allocation further comprises: the indication bits are determined according to r, and the r is as follows:

r=N(L−1)+x, 1≤L≤M, wherein x is an index of a starting resource allocated to the UE, and L is a number of resources allocated to the UE, and N is a positive integer and N∈{15, 25, 50, 75, 100}, and M is a positive integer no more than 7.

10. The method according to claim 2, wherein the number of the required indication bits is $Q=\lceil \log_2((N-M+2)*2^{M-1}-1)\rceil$.

11. The method according to claim 1, wherein the number of the required indication bits is $$Q = \left\lceil \log_2\left(M \times (N - M + 1) + \frac{M(M-1)}{2}\right) \right\rceil.$$

12. A device for indicating a resource allocation, comprising hardware for performing instructions in a non-transitory computer-readable storage medium which executes steps:
   determine required indication bits according to the following parameters:
   a number N of allocable resources in a system, and
   a maximum number M of allocated resources supported by User Equipment, UE, wherein 2≤M<N; and
   indicate the resource allocation by adopting the indication bits; wherein the indication bits are determined according to r, and the r is as follows: when x≤N−M≤N, r=x×M+L−1;
   wherein x is an index of a starting resource allocated to the UE, and L is a number of resources allocated to the UE; wherein the device implements flexible scheduling and relatively low overhead.

13. A non-transitory computer-readable storage medium, storing a computer-executable instruction, wherein the computer-executable instruction is used to execute the method according to claim 1.

14. The method according to claim 4, wherein the number of the required indication bits is $Q=\lceil \log_2((N-M+2)*2^{M-1}-1)\rceil$.

15. The method according to claim 6, wherein the number of the required indication bits is $Q=\lceil \log_2((N-M+2)*2^{M-1}-1)\rceil$.

16. The method according to claim 7, wherein the number of the required indication bits is $Q=\lceil \log_2((N-M+2)*2^{M-1}-1)\rceil$.

17. The method according to claim 8, wherein the number of the required indication bits is $$Q = \left\lceil \log_2\left(M \times (N - M + 1) + \frac{M(M-1)}{2}\right) \right\rceil.$$

18. The method according to claim 1, wherein the method for indicating a resource allocation further comprises: the indication bits are determined according to r, and the r is as follows:

when $x > N-M$, $r = (N-M+1) \times M + \sum_{i=0}^{N-1-x}(i) + L - 1$;

wherein x is an index of a starting resource allocated to the UE, and L is a number of resources allocated to the UE.

* * * * *